US009840957B2

United States Patent
Döring

(10) Patent No.: US 9,840,957 B2
(45) Date of Patent: Dec. 12, 2017

(54) METHOD AND APPARATUS FOR OPERATING A VEHICLE, IN PARTICULAR A WATERCRAFT

(71) Applicant: MAN Truck & Bus AG, München (DE)

(72) Inventor: Andreas Döring, München (DE)

(73) Assignee: MAN TRUCK & BUS AG, Munich (DE)

( * ) Notice: Subject to any disclaimer, the term of this patent is extended or adjusted under 35 U.S.C. 154(b) by 121 days.

(21) Appl. No.: 14/957,806

(22) Filed: Dec. 3, 2015

(65) Prior Publication Data
US 2016/0160769 A1    Jun. 9, 2016

(30) Foreign Application Priority Data
Dec. 3, 2014    (DE) .................. 10 2014 017 789

(51) Int. Cl.

| | | |
|---|---|---|
| B60T 7/12 | (2006.01) | |
| F01N 3/20 | (2006.01) | |
| F01N 3/10 | (2006.01) | |
| F01N 9/00 | (2006.01) | |
| F01N 3/025 | (2006.01) | |
| F01N 3/031 | (2006.01) | |
| F01N 13/00 | (2010.01) | |
| F02D 41/02 | (2006.01) | |
| F02D 41/38 | (2006.01) | |
| F02D 41/40 | (2006.01) | |
| F02D 41/00 | (2006.01) | |

(52) U.S. Cl.
CPC ......... *F01N 3/2053* (2013.01); *F01N 3/0253* (2013.01); *F01N 3/031* (2013.01); *F01N 3/106* (2013.01); *F01N 3/208* (2013.01); *F01N 9/00* (2013.01); *F01N 9/002* (2013.01); *F01N 13/0093* (2014.06); *F01N 13/0097* (2014.06); *F02D 41/021* (2013.01); *F01N 2900/12* (2013.01); *F01N 2900/1402* (2013.01); *F02D 41/0025* (2013.01); *F02D 41/0047* (2013.01); *F02D 41/0235* (2013.01); *F02D 41/3836* (2013.01); *F02D 41/402* (2013.01); *F02D 2200/501* (2013.01); *F02D 2200/701* (2013.01); *Y02T 10/24* (2013.01); *Y02T 10/47* (2013.01)

(58) Field of Classification Search
CPC .... F02D 41/402; F02D 2041/389; F02B 7/00; F02B 23/101
USPC ......... 701/101, 108, 115; 123/294, 304, 305
See application file for complete search history.

(56) References Cited

U.S. PATENT DOCUMENTS

| | | | | |
|---|---|---|---|---|
| 2004/0181322 A1* | 9/2004 | Okuyama | .............. | B63H 25/04 701/21 |
| 2016/0129925 A1* | 5/2016 | Jensen | .................... | B61L 3/006 701/19 |

(Continued)

*Primary Examiner* — John Kwon
(74) *Attorney, Agent, or Firm* — Lucas & Mercanti, LLP

(57) ABSTRACT

A method is provided for operating a vehicle, in particular a watercraft, with at least one combustion engine that emits pollutants contained in an exhaust gas or wastewater. The current position of the vehicle is determined by a location determination. A closed-loop and/or open-loop control device is provided which sets or adjusts the quantity of at least one pollutant emitted by the combustion engine in a self-acting manner or automatically, in accordance with the determined position of the vehicle and with information on local pollutant regulations, in particular exhaust and/or water regulations.

16 Claims, 2 Drawing Sheets

(56) References Cited

U.S. PATENT DOCUMENTS

2017/0106886 A1\* 4/2017 Shubs, Jr. ........... B61L 27/0077
2017/0129512 A1\* 5/2017 Shubs, Jr. .............. G07C 5/085

\* cited by examiner

METHOD AND APPARATUS FOR OPERATING A VEHICLE, IN PARTICULAR A WATERCRAFT

CROSS-REFERENCE TO RELATED APPLICATIONS

The present application claims priority of DE 10 2014 017 789.0 filed Dec. 3, 2014, which is incorporated herein by reference.

BACKGROUND OF THE INVENTION

The invention relates to a method for operating a vehicle, in particular a watercraft, an apparatus for operating the vehicle, and to a vehicle, in particular a watercraft, for carrying out the method and/or having the apparatus.

Watercraft, in particular ships, regularly cross national frontiers and thus enter regions with different exhaust regulations applicable to watercraft. For example, there are significant differences between the pollutant emissions allowed on the open seas and the permissible pollutant emissions in inshore regions of North America and Europe (referred to as Emission Controlled Areas or ECA, for short). Thus, in certain ECAs, for example, it is currently the case that only a fuel with a sulphur content of 15 ppm to 1000 ppm can be used, while a sulphur content of 1.5% to 3% is permissible on the open seas. When a watercraft operated with a combustion engine enters such an ECA, the type of fuel is therefore usually switched over from high-sulphur fuel to low-sulphur fuel. Currently, this switch is performed manually, i.e., through active intervention by the crew. However, manual switching results in a high failure rate owing to incorrect operation. In addition, the timing of the switch is often not ideal, i.e., the switch is performed either too early or too late. While a premature switch when entering an ECA leads to economic disadvantages for the ship's operator, an excessively late switch leads to the ship entering the ECA with pollutant emissions that are too high.

Owing to ever stricter exhaust regulations, it is furthermore necessary to provide exhaust gas aftertreatment systems even on watercraft.

BRIEF SUMMARY OF THE INVENTION

An object of the invention is to provide a method and an apparatus for operating a vehicle, in particular a watercraft, that satisfies the pollutant regulations in a simple, low-cost and reliable way.

The invention relates to a method for operating a vehicle, in particular a watercraft, wherein the vehicle has at least one combustion engine, in particular a combustion engine which emits pollutants contained in an exhaust gas and/or in wastewater, wherein the current position of the vehicle is determined by a location determination system, and wherein a closed-loop and/or open-loop control device is provided, that selectively sets or adjusts the quantity of at least one pollutant emitted by the combustion engine in a self-acting and/or automatic way, at least in accordance with the determined position of the vehicle and with information on local pollutant regulations, in particular exhaust and/or water regulations.

According to an embodiment of the invention, compliance with pollutant regulations is ensured in a reliable manner since the quantity of the at least one pollutant is set and/or adjusted automatically by the closed-loop and/or open-loop control device in accordance with the position of the vehicle and the pollutant regulations that apply in this position. In this way, a high failure rate in setting or adjusting the pollutant quantity emitted owing to incorrect manual operation can be avoided. The method according to the invention is also particularly low cost since the pollutant quantity emitted is automatically adapted to the stricter pollutant regulations, which usually lead to higher costs, only when the stricter regulations are in fact required. Moreover, the method according to the invention can be implemented in a particularly simple manner since vehicles, in particular watercraft, generally already have a position determination system for determining the current position of the vehicle. Systems for setting or adjusting the pollutant quantity emitted are also generally already provided on vehicles.

In this case, the position of the vehicle can be determined with satellite support, for example, by the GPS satellite system, the Galileo satellite system, the GLONASS satellite system or the Compass satellite system. As an alternative and/or in addition, however, it is also possible for the position of the vehicle to be determined terrestrially, for example, using radio signal transmission devices, in particular mobile phone transmission devices or W-LAN transmission devices.

In one embodiment, the self-acting and/or automatic setting and/or adjustment of the pollutant quantity additionally takes place in accordance with the current vehicle speed, determined by a speed determination system, and the current vehicle direction of travel, determined by a direction of travel determination system. It is thereby possible, e.g., when entering an ECA, to determine the optimum time for the selective setting and/or adjustment of the pollutant quantity emitted. The vehicle can thus always precisely comply with the respectively applicable pollutant regulations, e.g., when crossing an ECA boundary. The setting and/or adjustment of the pollutant quantity emitted is/are therefore carried out neither too early nor too late. The applicable pollutant regulations can thus be satisfied in a particularly low-cost and reliable manner.

The information on the local pollutant regulations is preferably stored in the closed-loop and/or open-loop control device in order to make available information in a simple and reliable manner. As an alternative and/or in addition, the information on the local pollutant regulations can be communicated to the closed-loop and/or open-loop control device by at least one external information system. The at least one external information system can be an environmental and/or public health agency, for example, which can be connected for data transmission to the closed-loop and/or open-loop control device by a wireless link. By virtue of the communication of the information on the local pollutant regulations from the external information systems, it is also possible to take significantly better account of changes to the local pollutant regulations, thus allowing automatic setting and/or adjustment of the pollutant quantity emitted always to take place in accordance with updated or currently applicable local pollutant regulations. If, for example, stricter pollutant regulations apply in an ECA in the case of a weather inversion, these are then automatically taken into account by the closed-loop and/or open-loop device. The current pollutant emissions of the vehicle can then furthermore also preferably be communicated to an external information system by the closed-loop and/or open-loop control device.

For selective setting and/or adjustment of the pollutant quantity emitted by the closed-loop and/or open-loop control device, at least one component of the vehicle which affects the pollutant quantity can preferably be adjusted to a plurality of operating modes, wherein the pollutant quantity emitted by the vehicle is different in each operating mode. The pollutant quantity can thus be set and/or adjusted selectively in a particularly simple and reliable manner.

For setting or adjustment of the pollutant quantity by the closed-loop and/or open-loop control device, at least one parameter of the combustion engine is preferably adjusted and/or set in order to adjust and/or set the pollutant quantity emitted in a simple and effective manner. In this case, the at least one parameter can, for example, be the combustion air ratio and/or the number of injections and/or the exhaust gas quantity recirculated by an exhaust gas recirculation system and/or the injection pressure and/or the injection characteristic.

For setting and/or adjustment of the pollutant quantity by the closed-loop and/or open-loop control device, at least one parameter of an exhaust gas aftertreatment system of the vehicle can also be adjusted and/or set as an alternative and/or in addition. This also allows the pollutant quantity to be set and/or adjusted in a simple and effective manner. The at least one parameter of the exhaust gas aftertreatment system can, for example, be the combustion air ratio and/or the supplied reducing agent quantity for an SCR catalyst of the exhaust gas aftertreatment system and/or the regeneration of a particulate filter of the exhaust gas aftertreatment system and/or an exhaust gas flow through a bypass device of the exhaust gas aftertreatment system. Moreover, the at least one parameter can also be the wastewater quantity passed through an exhaust gas scrubber of the exhaust gas aftertreatment system and/or the wastewater quantity passed into the body of water by the vehicle designed as a watercraft, in particular from an exhaust gas scrubber, and/or the pH of the wastewater passed into the body of water by the vehicle designed as a watercraft, in particular from an exhaust gas scrubber.

For setting and/or adjustment of the pollutant quantity by the closed-loop and/or open-loop control device, it is furthermore possible, as an alternative and/or in addition, for the type of fuel supplied to the combustion engine to be set and/or adjusted.

To achieve the object already mentioned, an apparatus for operating a vehicle, in particular a watercraft, is furthermore proposed, wherein the vehicle has at least one combustion engine, in particular a combustion engine which emits pollutants contained in an exhaust gas and/or in wastewater, wherein a location determination system is provided, that determines the current position of the vehicle, and wherein a closed-loop and/or open-loop control device is provided, that selects and/or adjusts the quantity of at least one pollutant emitted by the combustion engine in a self-acting and/or automatic way, at least in accordance with the determined position of the vehicle and with information on local pollutant regulations, in particular exhaust and/or water regulations.

The advantages resulting from the apparatus according to the invention are identical with the already acknowledged advantages of the method according to the invention, and they will therefore not be repeated at this point.

A vehicle, in particular a watercraft, for carrying out the method according to the invention and/or having the apparatus according to the invention is furthermore claimed. The resulting advantages are likewise identical with the already acknowledged advantages of the method according to the invention, and therefore they too will not be repeated at this point.

The advantageous embodiments and/or developments of the invention which are explained above and/or described in the dependent claims can be used individually or in any combination with one another, apart from those cases of univocal dependency relationships or incompatible alternatives, for example.

BRIEF DESCRIPTION OF THE DRAWINGS

The invention and the advantageous embodiments and developments thereof and the advantages thereof are explained in greater detail below, purely by way of example, by means of drawings, in which.

DETAILED DESCRIPTION OF THE PREFERRED EMBODIMENTS

Figure 1:
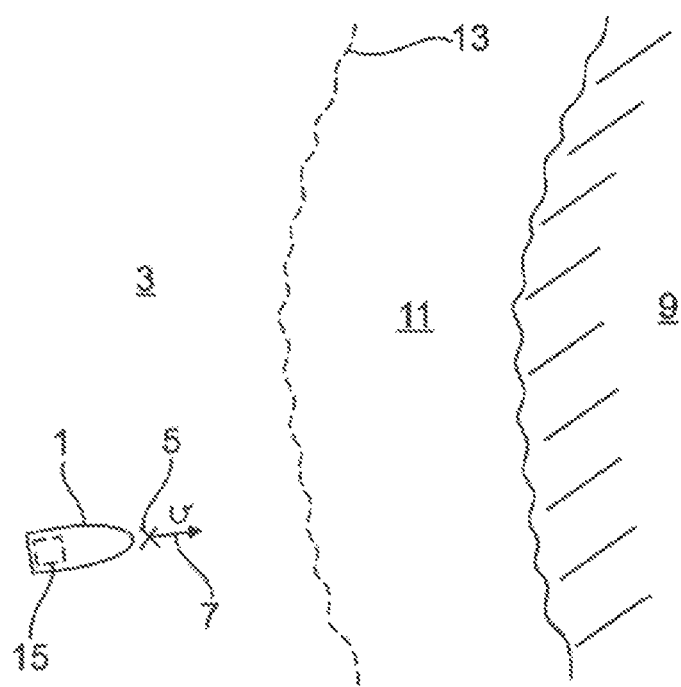
FIG. 1 shows a ship heading for a coastal region in a schematic illustration from above.

A vehicle designed as a ship 1 is shown by way of example in FIG. 1. Here, the ship 1 is on a body of water 3 in a position 5 and is moving towards a coast 9 in the direction of travel 7 at a speed v. In an inshore region of the body of water 3 there is an "Emission Controlled Area" 11 (ECA), which extends over a defined distance from the coast 9 to a boundary 13 indicated by a dashed line. In the illustration shown in FIG. 1, the ship 1 is still outside the ECA 11, but is on the way into the ECA 11. In the inshore ECA 11, the applicable exhaust regulations for the ship 1 are stricter than outside the ECA 11 on the body of water 3. In order to comply with the exhaust regulations in the ECA 11 and, at the same time, also to ensure economical operation of the ship 1, a drive system 15 (indicated by the dashed lines in FIG. 1) of the ship 1 has a closed-loop and/or open-loop control device 17 (FIG. 2), by means of which the quantity of pollutants in an exhaust gas (arrow 35, FIG. 2) from the drive system 15 can be set selectively to match the applicable local exhaust regulations.

Figure 2:
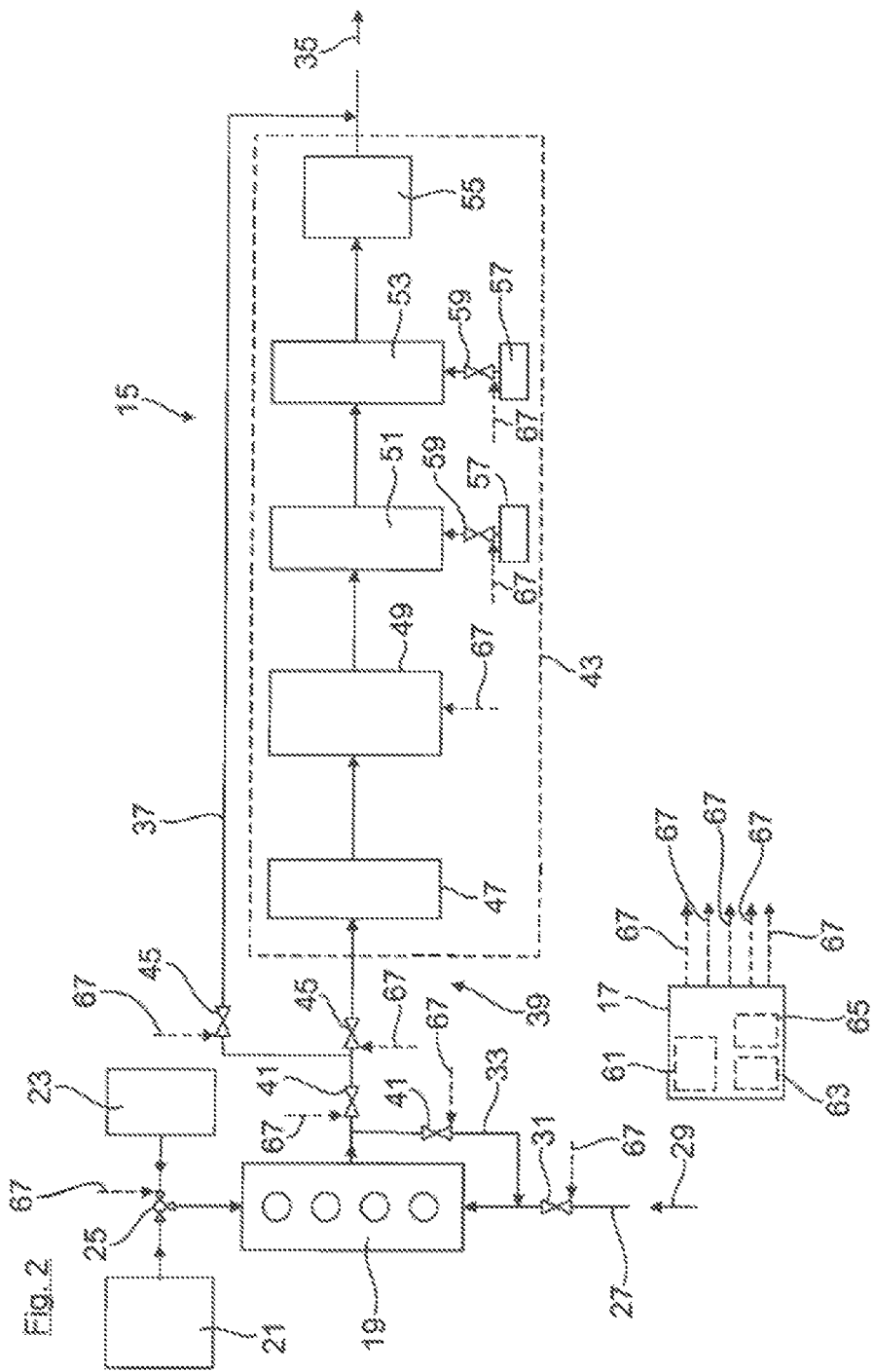
FIG. 2 shows a drive system of the ship in a schematic illustration.

The construction and operation of the drive system 15 is explained in greater detail below with reference to FIG. 2:

As shown in FIG. 2, the drive system 15 of the ship 1 has a combustion engine 19, which is here coupled to a plurality of fuel tanks, here two fuel tanks 21 and 23 by way of example. In this case, fuel tank 21 contains a fuel with a high sulphur content, e.g. 1.5% to 3%, while fuel tank 23 contains a fuel with a low sulphur content, e.g. 15 ppm to 1000 ppm. Moreover, a multiway valve 25 is provided here, to which both the fuel tanks 23 and the combustion engine 19 are connected. In a first valve position of the multiway valve 25, the fuel flow from fuel tank 21 to the combustion engine 19 is enabled, while the fuel flow from fuel tank 23 to the combustion engine 19 is shut off. In a second valve position of the multiway valve 25, the fuel flow from fuel tank 21 to the combustion engine 19 is shut off, while the fuel flow from fuel tank 23 to the combustion engine 19 is enabled.

As can furthermore be seen from FIG. 2, the drive system 15 has an intake tract 27, by means of which combustion air (arrow 29) is supplied to the combustion engine 19. A continuously variable straightway valve, here a throttle valve 31 by way of example, which controls the supply of combustion air 29 to the combustion engine 19, is arranged in the intake tract 27. The drive system 15 furthermore optionally also has an exhaust gas recirculation system 33, which can recirculate some of an exhaust gas emitted by the combustion engine 19 into the intake tract 27. As seen in the direction of flow of the exhaust gas, the exhaust gas can be diverted from an exhaust line 39 of the drive system 15 downstream of the combustion engine 19 and upstream of a bypass device 37 and, as seen in the direction of flow of the air, can be introduced into the intake tract 27 of the drive system 15 downstream of the throttle valve 31 and upstream of the combustion engine 19. To set the recirculated exhaust gas quantity, two continuously variable straightway valves 41 are provided here by way of example. In this case, one of the straightway valves 41 is arranged in the exhaust line 39 downstream of the exhaust gas recirculation system 33 and upstream of the bypass device 37, as seen in the direction of flow of the exhaust gas. The other of the straightway valves 41 is arranged in the exhaust gas recirculation system 33.

Moreover, at least some of the exhaust gas flow from the combustion engine 19 can be carried past an exhaust gas aftertreatment system 43 of the drive system 15 by means of the bypass device 37. Here, the setting of the exhaust gas quantity guided past the exhaust gas aftertreatment system 43 is accomplished by two continuously variable straightway valves 45, by way of example. Here, one of the straightway valves 45 is arranged in the exhaust line 39 downstream of the bypass device 37 and upstream of the exhaust gas aftertreatment system 43, as seen in the direction of flow of the exhaust gas, while the other of the straightway valves 45 is arranged in the bypass device 37.

As is furthermore shown in FIG. 2, the exhaust gas aftertreatment system 43 has, here purely by way of example, a plurality of components. Thus, the exhaust gas aftertreatment system 43 here has an oxidation catalyst 47, a particulate filter 49, a first SCR catalyst 51, a second SCR catalyst 53 and an ammonia barrier catalyst 55 arranged in series, as seen in the direction of flow of the exhaust gas. Here, the particulate filter 49 can be regenerated at a defined adjustable frequency and over a defined adjustable time interval, wherein the particles collected in the particulate filter 49 are burnt, for example. A container 57 filled with a reducing agent is in each case connected to the SCR catalysts 51 and 53. By means of the reducing agent, the SCR catalysts 51 and 53 can reduce the nitrogen oxides in the exhaust gas 35 in an effective manner. In this case, the reducing agent can be an aqueous urea solution, for example. To set the quantity of reducing agent introduced into the SCR catalysts 51 and 53, continuously variable straightway valves 59 are provided here, for example.

The abovementioned closed-loop and/or open-loop control device 17 of the drive system 15 furthermore has a location determination system 61 indicated by dashed lines, by means of which the current position of the ship 1 can be determined. Here, the current position can be determined, for example, with satellite support with the aid of the GPS satellite system, the Galileo satellite system, the GLONASS satellite system and/or the Compass satellite system. However, the position of the ship 1 can also be determined terrestrially using a radio signal transmission device for example, e.g., mobile telephone masts or W-LAN transmission devices. The speed and direction of travel of the ship 1 can then also be determined by the closed-loop and/or open-loop control device 17 from the positions of the ship determined by the location determination system 61.

Moreover, the closed-loop and/or open-loop control device 17 here also has a transmitting and/or receiving device 63 indicated by dashed lines, which can receive information on local exhaust regulations, in this case, by way of example, the exhaust regulations in the ECA 11 and the exhaust regulations outside the ECA 11 on the body of water 3, from external information systems, e.g., environmental or public health agencies. The information received is then transferred to and stored on a storage device 65 (likewise illustrated by dashed lines in FIG. 2) of the closed-loop and/or open-loop control device 17, the storage device 65 being coupled for data transmission to the transmitting and/or receiving device 63.

The closed-loop and/or open-loop control device 17 is also coupled to said valve devices 25, 41, 45 and 59 in such a way in terms of signal engineering that these valve devices can be controlled by the closed-loop and/or open-loop control device 17. The closed-loop and/or open-loop control device 17 is likewise also coupled to the particulate filter 49 in terms of signal engineering, with the result that it is also possible to control the frequency and duration of regeneration of the particulate filter 49 by the closed-loop and/or open-loop control device 17. Here, the control of said components by the closed-loop and/or open-loop control device 17 takes place by means of control signals 67 indicated by dashed lines in FIG. 2.

Depending on the position, speed and direction of travel of the ship 1 and depending on information on the local exhaust regulations, the closed-loop and/or open-loop control device 17 self-actingly or automatically determines the optimum time and suitable measures, i.e., suitable control by the control signals 67, for the selective setting and/or adjustment of the pollutant quantity in the exhaust gas 35 emitted by the drive system 15, and carries out this measure in a self-acting or automatic way.

LIST OF REFERENCE SIGNS 1 ship
3 body of water
5 position
7 direction of travel
9 coast
11 ECA
13 boundary
15 drive system
17 closed-loop and/or open-loop control device
19 combustion engine
21 fuel tank
23 fuel tank
25 multiway valve
27 intake tract
29 combustion air
31 throttle valve
33 exhaust gas recirculation system
35 exhaust gas
37 bypass device
39 exhaust line
41 straightway valve
43 exhaust gas aftertreatment system
45 straightway valve
47 oxidation catalyst
49 particulate filter
51 SCR catalyst
53 SCR catalyst
55 ammonia barrier catalyst
57 container
59 straightway valve
61 location determination system
63 transmitting and/or receiving device
65 storage device
67 control signal

The invention claimed is:

1. A method for operating a vehicle having at least one combustion engine that emits pollutants contained in at least one of an exhaust gas and wastewater, the method comprising:
   determining a current position of the vehicle using a location determination system; and
   adjusting, by a control device, a quantity of at least one pollutant emitted by the combustion engine selectively in accordance with the determined position of the vehicle and with information on local pollutant regulations,
   wherein the step of adjusting includes adjusting or setting at least one parameter of an exhaust gas aftertreatment system of the vehicle, the parameter being at least one of a wastewater quantity passed through an exhaust gas scrubber of the exhaust gas aftertreatment system, a wastewater quantity passed into the body of water by the vehicle and the pH of the wastewater passed into the body of water by the vehicle.

2. The method according to claim 1, wherein the step of adjusting is in accordance with a current vehicle speed, determined by a speed determination system, and a current vehicle direction of travel, determined by a direction of travel determination system.

3. The method according to claim 1, further comprising at least one of storing information on the local pollutant regulations in the control device, communicating the information on the local pollutant regulations to the control device by at least one external information system, and communicating the current pollutant emissions of the vehicle to an external information system by the control device.

4. The method according to claim 1, wherein the step of adjusting includes adjusting at least one component of the vehicle that affects the pollutant quantity of the combustion engine to one of a plurality of operating modes, wherein the pollutant quantity emitted by the combustion engine is different in each of the operating modes.

5. The method according to claim 1, wherein the step of adjusting includes adjusting or setting at least one parameter of the combustion engine.

6. The method according to claim 5, wherein the parameter is at least one of the combustion air ratio, the number of injections, the exhaust gas quantity recirculated by an exhaust gas recirculation system, an injection pressure, and an injection characteristic.

7. The method according to claim 1, wherein the at least one parameter of the exhaust gas aftertreatment system of the vehicle further includes at least one of a combustion air ratio, a supplied reducing agent quantity for an SCR catalyst of the exhaust gas aftertreatment system, a regeneration of a particulate filter of the exhaust gas aftertreatment system, an exhaust gas flow through a bypass device of the exhaust gas aftertreatment system.

8. The method according claim 1, wherein the step of adjusting includes adjusting or setting a type of fuel supplied to the combustion engine.

9. An apparatus for operating a vehicle having at least one combustion engine that emits pollutants contained in at least one of an exhaust gas and a wastewater, the apparatus comprising:
   a location determination system by determining a current position of the vehicle;
   a control device adjusting the quantity of at least one pollutant emitted by the combustion engine selectively in accordance with the determined position of the vehicle and with information on local pollutant regulations; and
   an exhaust gas aftertreatment system with at least one further control device shiftable into a plurality of control positions, each of the positions and adjusts at least one parameter of the exhaust gas aftertreatment system which affects the pollutant quantity, wherein a shifting of the further control device is controlled by the control device, the at least one parameter being at least one of a wastewater quantity passed through an exhaust gas scrubber of the exhaust gas aftertreatment system, a wastewater quantity passed into the body of water by the vehicle and the pH of the wastewater passed into the body of water by the vehicle.

10. The apparatus according to claim 9, further comprising a speed determination system determining a vehicle speed and a direction of travel determination system determining a vehicle direction of travel, wherein the quantity of at least one pollutant is adjusted by the control device in accordance with the determined current vehicle speed and the determined current vehicle direction of travel.

11. The apparatus according to claim 9, wherein the control device includes at least one of:
   a storage device, in which the information on the local pollutant regulations is stored; and
   a transmitting and/or receiving device that at least one of receives the information on the local pollutant regulations from an external information system, and communicates the current pollutant emissions of the vehicle to an external information system.

12. The apparatus according to claim 9, wherein the combustion engine has at least one further control device having a plurality of control positions, each of the positions and adjusts at least one parameter of the combustion engine which affects the pollutant quantity, wherein a shifting of the further control device is controlled by the control device.

13. The apparatus according to claim 9, wherein the exhaust gas aftertreatment system includes at least one of a bypass device which guides or carries at least some of the exhaust gas flow past at least one exhaust gas aftertreatment element of the exhaust gas aftertreatment system, and the further control device is a valve device which adjusts or sets the exhaust gas flow through the bypass device and through the at least one exhaust gas aftertreatment element.

14. The apparatus according to claim 13, wherein the at least one exhaust gas aftertreatment element is an SCR catalyst or a desulphurization device.

15. The apparatus according to claim 9, further comprising a further control device that adjusts or sets a type of fuel supplied to the combustion engine, wherein the further control device is controlled by the control device.

16. A vehicle comprising a watercraft having an apparatus according to claim 9.

* * * * *